April 8, 1930.  A. A. HOLSEN  1,753,888
TOOL FOR COMPRESSING VALVE SPRINGS
Filed May 21, 1928
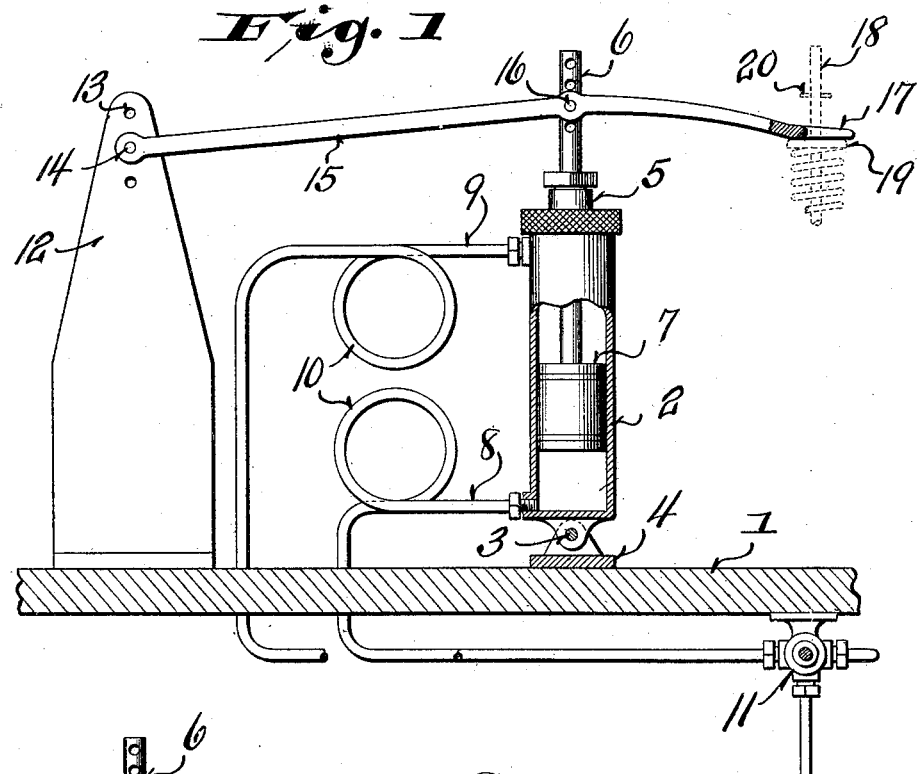
Fig. 1
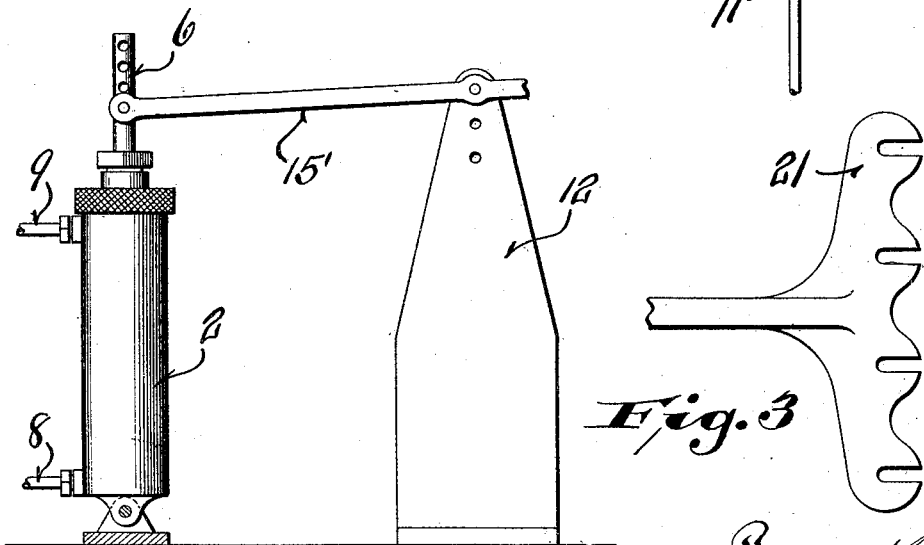
Fig. 2
Fig. 3
Inventor:
Alban A. Holsen
By
Attorneys Patented Apr. 8, 1930

1,753,888

UNITED STATES PATENT OFFICE

ALBAN A. HOLSEN, OF TWO RIVERS, WISCONSIN

TOOL FOR COMPRESSING VALVE SPRINGS

Application filed May 21, 1928. Serial No. 279,398.

This invention relates to a tool for compressing valve springs.

In automobiles it is the usual practise to compress the spring of a valve prior to the removal of the valve. It is also well recognized that in garages, and other places, such as repair shops where frequent valve grinding, or other work upon the valve is necessitated, the compression of the springs prior to removal of the valves consumes considerable time and effort.

This invention is designed to provide a tool for compressing springs of valves, such tool being operated by fluid pressure, and easily controlled to either compress the spring or to release the spring pressure after the retaining pin has been removed.

Further objects are to provide a device which may be readily mounted upon a bench, which has a minimum number of parts, and which is extremely cheap.

Embodiments of the invention are shown in the accompanying drawings, in which:

Figure 1 is a side elevation of the device, with parts in section.

Figure 2 is a fragmentary view of a modified form.

Figure 3 shows a further form of spring engaging end or head.

Referring to Figure 1, it will be seen that the device is illustrated as mounted upon a work bench 1. The device consists of a cylinder 2 pivoted at 3 to a bracket 4 secured upon the bench 1. This cylinder is provided with a stuffing box 5 through which the piston rod 6 passes, such rod being connected to a relatively long piston 7 mounted within the cylinder 2. The cylinder is supplied by means of two pipes 8 and 9 connected to opposite ends thereof, and each provided with one or more loops or convolutions, such as indicated at 10. The purpose of this construction is to permit a slight motion of the cylinder without binding or stressing the pipes. The admission and exhaust of fluid is controlled by means of the three-way valve 11 which is manually controlled in a very simple manner. The pressure fluid may be either air, water under pressure, oil, or other means as required. It is usually the case that supply of compressed air is found around garages and this may be readily employed.

A bracket 12 projects upwardly from the support or table 1, and is provided with a plurality of holes 13 adapted to receive the pintle pin 14 by means of which a rocking lever 15 is pivotally joined to the bracket. Intermediate the ends of the lever 15 it is preferably provided with a slight enlargement through which a pin 16 may be passed. This pin pivotally joins the lever 15 with the piston rod 6. The outer end of the lever 15 is forked, as indicated at 17, and is adapted to span the valve rod 18 and to engage the washer 19, or else the end of the spring as required.

It is obvious that in using the device the valve head with the valves thereon is placed upon the table and the forked end 17 of the lever 15 is slipped into place about the desired valve rod. Thereafter the valve 11 is operated and the spring is compressed, thus allowing removal of the securing pin 20, or other fastening means, and securing the compression of the spring without any effort upon the part of the operator.

In the form shown in Figure 2 it is apparent that the same inventive idea is employed, the bracket 12 and the cylinder 2 being interchanged as to position. The lever 15′ is identically like the lever previously described, except that the piston rod 6 is attached to the outer end of the lever and the lever is pivoted to the bracket intermediate its ends. Under this condition fluid pressure may be applied to the under side of the piston to cause compression of the springs, as previously described, and there is thus greater freedom from leaking at the stuffing box. Otherwise the two forms of the invention are identically the same.

Figure 3 shows a form of head 21 which is designed to a use with a plurality of springs simultaneously. In other words, in the form shown four springs can be readily compressed at a single time by a single stroke of the piston.

It will be seen that an extremely simple type of mechanism has been provided, which is power operated, and which will compress the valve springs of internal combustion engines without any effort on the part of the operator.

Although the invention has been described in considerable detail, such description is intended as illustrative rather than limiting as the invention may be variously embodied and as the scope of such invention is to be determined as claimed.

I claim:

1. A tool for compressing valve springs comprising a support, a cylinder pivoted upon said support, a lever transversely of the cylinder, means for pivotally and adjustably supporting one end of said lever, said cylinder having a piston and a piston rod, means pivotally joining said piston rod with the intermediate portion of said lever, and a fork at the other end of the lever adapted to engage the valve spring.

2. A tool for compressing valve springs comprising a support, a cylinder pivoted upon said support, a lever transversely of the cylinder, means for pivotally and adjustably supporting one end of said lever, said cylinder having a piston and a piston rod, means pivotally joining said piston rod with the intermediate portion of said lever, manually controlled means for admitting fluid under pressure of said cylinder, and valve spring engaging means at the other end of the aforesaid lever.

3. A valve spring compressor comprising a supporting table, a bracket secured to said table, a lever pivotally carried by said bracket and having a forked spring-engaging end, a cylinder pivotally supported by said table, a piston carried within said cylinder, a piston rod rigid with said piston and pivotally connected to said lever, pipes leading from opposite ends of said cylinder, and a manually controlled, three-way valve connected to said pipes and to a source of pressure fluid.

4. A valve spring compressor comprising a supporting table, a bracket secured to said table, a lever pivotally carried by said bracket and having a forked spring-engaging end, a cylinder pivotally supported by said table, a piston carried within said cylinder, a piston rod rigid with said piston and pivotally connected to said lever, pipes leading from opposite ends of said cylinder, and a manually controlled, three-way valve connected to said pipes and to a source of pressure fluid, said pipes having loops therein to permit flexing.

In testimony that I claim the foregoing I have hereunto set my hand at Two Rivers, in the county of Manitowoc and State of Wisconsin.

ALBAN A. HOLSEN.